United States Patent [19]
Witt

[11] Patent Number: 5,385,678
[45] Date of Patent: * Jan. 31, 1995

[54] FILTER MATERIAL

[75] Inventor: Paul R. Witt, Muscatine, Iowa

[73] Assignee: Grain Processing Corporation, Muscatine, Iowa

[*] Notice: The portion of the term of this patent subsequent to May 19, 2009 has been disclaimed.

[21] Appl. No.: 32,969

[22] Filed: Mar. 18, 1993

[51] Int. Cl.$^6$ ............................................. B01D 15/00
[52] U.S. Cl. .................................... 210/777; 210/193
[58] Field of Search ................ 426/330.4, 423, 495; 210/805, 767, 639, 806, 777, 778, 193; 502/62

[56] References Cited

U.S. PATENT DOCUMENTS 5,008,018  4/1991  Raible .............................. 210/805 X
5,114,894  5/1992  Witt ....................................... 502/62

Primary Examiner—Frank Spear
Attorney, Agent, or Firm—Fitch, Even, Tabin & Flannery

[57] ABSTRACT

A granular filter aid composition for filtering liquids composed of a major amount of phosphorylated starch and minor amounts of silica gel and cellulosic fibers.

17 Claims, No Drawings

FILTER MATERIAL

This invention relates to a material useful for filtering liquids and in particular liquid beverages.

BACKGROUND OF THE INVENTION

Various liquid beverages are customarily filtered in the manufacturing process to provide the clarity that consumers expect. Beer is one of those beverages. Unfiltered ruh beer, which is the product obtained after fermentation, contains yeast cells and many insoluble fermentation debris fragments that must be removed. Ruh beer generally contains from $10^7$ to less than $10^6$ cells per milliliter, but will vary depending on the brewing process used. Ruh beer is partially carbonated and is filtered through a filter screen after a filter aid has been applied to the screen.

Brewers conventionally remove such materials by filtering the fermented beer through a filter bed of inorganic material. Typically, to form this filter bed, a slurry of the inorganic material (usually diatomaceous earth or silicic acid) is pumped to a fine mesh stainless steel screen. As the bed begins to form on top of the screen, the water slurry that comes through the screen is recirculated to the top of the filter bed to finish bed formation. The time required for formation of the bed and the firmness of the bed are important to beer manufacturers.

Diatomaceous earths in contact with liquids are known to transfer soluble iron to the liquids. If the transfer of iron is to be avoided, specially treated filters may be used such as described in U.S. Pat. Nos. 4,202,910 and 4,134,857. Specially treated silicon dioxide particles are also sometimes used as a filter aid. These materials are prepared and used as described in U.S. Pat. Nos. 4,647,464 and 4,457,900. The filtered beer should be clear to the eye. Moreover, the filtered beer should have the same clarity and organoleptic aspects after pasteurizing as a beer processed through diatomaceous earth.

The pore size of filter screens used to filter beverages such as beer may vary from one producer to another but is frequently on the order of 60 microns. A diatomaceous earth such as Hyflo-Super-Cel, manufactured by Johns Manville Corporation, is frequently used as a precoating material for the filter screens used in beer breweries. Such filter aids or precoating materials, after use, are a waste material and pose a disposal problem.

A typical analysis of a diatomaceous earth filter aid commonly used for beer production is:

| pH | 10.0 |
| Water solubles, % | 0.15 |
| Iron (as $Fe_2O_3$), % | 1.5 |

Beer, wine and many juices have a pH of 4.5 or lower, and there is evidence that iron present in the filter aid is solubilized in such acidic liquids. In the instance of beer, iron has been known to have a negative effect on clarity and flavor.

OBJECTS OF THE INVENTION

A principal object of the present invention is to provide an advantageous filter aid material for use in filtering liquids such as beverages.

Another object of the invention is to provide a filter aid material that can be recovered after filtration and used as animal feed.

A further object of the invention is to provide a filter aid material that imparts no soluble iron to acidic liquids during filtration.

A still further object of the invention is to provide a novel filter aid material for filtering liquids which is biodegradable with resultant minimization of disposal problems.

SUMMARY OF THE INVENTION

This invention relates to a filter material advantageously adapted for filtering liquids, including particularly liquid beverages such as beer and fruit juices. The filter aid composition of this invention comprises a major amount of phosphorylated starch and minor amounts, less than a total of about 10% of the composition, of silica gel and cellulosic fibers. Preferably, the amount of silica gel and cellulosic fibers in the composition are each less than 5% by weight of the composition. The phosphorylated starch is cross-linked so as to be substantially insoluble in water. The filter composition is produced in dry, granular form with the granules having a particle size so as to be retained on the filtering screen which is to be used for filtering liquids.

DETAILED DESCRIPTION OF THE INVENTION

The filter aid material of this invention comprises a cross-linked phosphorylated starch prepared by reacting starch and a phosphate salt. Cross-linking of the starch by phosphorylation is conducted so as to render the starch substantially insoluble in water and to increase the rigidity and granule particle size for retention on a filter screen. Cross-linking of starch by phosphorylation to insolubilize the starch and to increase the particle size of the starch granules is well known in the art. See, for example, U.S. Pat. Nos. 4,566,910, 3,459,632 and 2,884,412. Using a known phosphorylation procedure, those skilled in the art can readily prepare cross-linked phosphorylated starches having the required insolubility and particle size. Any variety of starch can be employed to form the filter aid of this invention, including waxy and non-waxy starches, i.e., starch derived from corn, potato, milo, wheat, and the like.

According to one preferred embodiment of preparing the filter aid composition of the invention, an aqueous slurry of starch having a solids content in the range of say about 40 to 45% is reacted at an alkaline pH, preferably a pH of 10.0 to 10.5, with a phosphorylating agent, preferably in the form of a liquid solution, such as a phosphate salt, for example sodium pyrophosphate. Generally, the phosphorylating agent is employed in an amount ranging from about 1 to 2% by weight of starch or more, if required, to achieve sufficient cross-linking for insolubilization and swelling of the starch granule. The reaction of the starch with the phosphorylating agent is conducted at a temperature of about 60° to 70° C., preferably 66° to 68° C. or higher, for a period on the order of say 30 to 60 minutes.

Prior to the phosphorylation reaction a known viscosity stabilizing agent, preferably in liquid form, such as sodium sulfate, sodium chloride or the like, is preferably included in the starch-phosphorylating agent reaction mixture to prevent an undesirable increase in viscosity during the reaction. Preferably the Brookfield viscosity of the starch-phosphorylating agent reaction paste containing 40–45% solids is maintained in the range of 100 to 200 centipoise at 60° C. and a pH of 10.0 to 10.5. The viscosity stabilizing agent is generally employed in the slurry in amounts between about 1.7 to 2.0% by weight of starch. The viscosity stabilizing agent serves to prevent gelatinization of the starch. Starch gelatinization is to be avoided.

While the reaction mixture is maintained at an alkaline pH and at a temperature above 60° C., a silica gel is incorporated in the starch-phosphate salt reaction mixture. The silica gel is added in an amount to provide about 1.0 to 3.0% dry silica by weight of starch to improve the integrity of the starch granule. The silica gel also improves the chillproofing properties of filtered beer. The silica gel employed is in contrast to colloidal silica and can be a silica hydrogel containing significant moisture, for example, 50–60%, or an xerogel of low moisture content, as for example not more than about 10% moisture. A silica hydrogel is preferred. Silica gels are commercially available from a number of suppliers, such as PQ 5108 available from PQ Corporation, Valley Forge, Pa.; Cross-J.D.-4 available from Crossfield Chemical Company, Joliet, Ill.; Fuji #30, available from Fuji-Davison Chemical Co., Nagoya-Shi, Japan; and Cabot Silica Gel available from Cabot Corporation, Tuscola, Ill.

After addition of the silica gel, the starch slurry is maintained at the elevated reaction temperature and alkaline pH for a short period of say 10–25 minutes. Then, the reaction slurry is acidified to a pH less than 6.0, preferably a pH of 5.0 to 5.5. A small amount of cellulosic fibers is then added to the acidified slurry in an amount of say 1.5 to 2.5% by weight of the starch. Relatively long cellulosic fibers having an average length on the order of at least 60 microns are preferred. The cellulosic fibers employed preferably exhibit relatively low water absorption capacity, i.e., the fibers should not absorb more than about 6 grams of water per gram. Solka-Floc ® 40, manufactured by James River Corporation, Richmond, Va., is exemplary of a preferred type of cellulosic fiber. Solka-Floc ® 40 is cellulose fiber material having an average fiber length of 60 microns, a bulk density of 2.8–3.2 cubic centimeters per gram and absorbs only about 5.5 grams of water per gram.

Thereafter, the slurry is filtered and the filter cake washed. It is preferred to wash the filter cake with water containing a microbicide such as peracetic acid, peroxide and others known to be useful for microbial control in starch food products. Preferably, the filter cake from the first filtration is reslurried in water and again filtered and washed.

After washing, the filter cake is dried at a temperature above 50° C., say about 50° to 100° C., and then ground to produce a granulated product, with the bulk (75–80%) of the granules having a particle size somewhat larger than the mesh size of the filter screen on which the filter aid is to be employed. For effectiveness as a filter aid material, the particle size of the filter aid must be sufficiently large to be retained on the filter screen. Thus, the filter cake can be ground, if necessary, so that the bulk of the particles have a size substantially greater than the mesh of the filter screen contemplated for use. For example, if the filter aid composition is to be used with a filter screen having a mesh size of 60 microns, it is preferred that the particle size of the filter aid be say about 80 microns.

The following examples further illustrate the present invention and the advantages thereof:

EXAMPLE 1

A water slurry of corn starch having a solids content of about 40% is prepared, and 1.8 weight percent sodium sulfate (starch solids basis) is dissolved in the starch slurry at about 45° C. The slurry is then heated to about 68° C., followed by addition of 2.0 molar sodium hydroxide, equivalent to 0.44% by weight, based on starch solids. Sodium pyrophosphate, equivalent to 1.1% by weight starch solids, is then dissolved in water and then added to the slurry.

The temperature is maintained at about 68° C. for 45 minutes, after which 2.3% by weight silica gel is added (2.3% on dry solids and dry starch basis). The silica gel employed is Cross-J.D.-4, manufactured by Crossfield Chemical Company, Joliet, Ill. After addition of the silica gel, the slurry is then held for an additional 15 minutes at about 68° C. The pH of the slurry at this stage is about 9.8–10.6. After the holding period at near pH 10, the mixture is adjusted to approximately pH 5.5, and cellulose fiber (Solka-Floc ® 40) is dispersed in the slurry in an amount of 1.8% based on dry starch weight.

The slurry is then filtered, then the cake is reslurried in water at 50° C. and again filtered. Thereafter the washed cake is dried in forced ventilation at a temperature in the range of 50°–100° C. The dried cake is crushed in a roller mill to produce a product of desired granulation, that is, with the bulk (80%) of the dry granules being about 80 microns in diameter.

EXAMPLE 2

This example gives a convenient procedure for evaluating a filter aid for precoating a filter screen used to filter liquids.

A stirred water slurry is prepared by adding the filter aid material to water to provide about a 2% by-weight suspension (25 grams filter aid in 1200 milliliters of water). After suspension, the slurry is recirculated through a mesh screen to effect build-up of a precoat thereon.

The filtrate of the filter aid suspension is recirculated at 400 milliliters per minute through a 9-inch diameter, horizontal screen pressure filter, having 60 micron pore openings. The efficiency of filter aid precoat material is evidenced by the time required for the recirculated effluent water to be clear to the eye or to exhibit not substantially more than 80 Formazin Turbidity Units (FTU). Preferred precoat materials achieve these criteria in shorter times.

EXAMPLES 3–15

Filter aid precoat compositions of the invention were prepared according to the procedure described in Example 1, with the proportions and commercial source of the silica gel being varied.* A comparison with other compositions was made. In each example twenty-five hundred grams of an aqueous starch slurry were used containing 1090 grams of starch on dry basis.

After the filter aid product was prepared it was tested, as described in Example 2, by circulating a water slurry through a 9-inch diameter filter equipped with a screen having 60-micron-pore openings. A bentonite-starch sample, prepared as described in U.S. Pat. No. 5,114,894, was used as a control.

The results, given in Table I below show the characteristics of a number of starch-silica gel filter aid

| Material | Moisture | Type |
|---|---|---|
| P.Q. 5108 | 66 | Hydrogel |
| P.Q. 4250 | 60 | Hydrogel |
| J.D.-5 | 4 | Xerogel |
| J.D.-4 | 67 | Hydrogel |
| Fuji #30 | 8 | Xerogel |
| Cabot | 85 | Hydrogel | compositions according to this invention. The beer filtered in these tests was an all-malt ruh beer.

TABLE I

| Example | Type of Silica Gel in Filter Aid Composition | Proportion Silica Expressed as % Dry Starch As is | Proportion Silica Expressed as % Dry Starch Dry Silica | Firmness of Prepared Filter Bed | Clarity of Recirculation Water Effluent Minutes to Achieve Eye Clear | Clarity of Recirculation Water Effluent Minutes to Achieve 80 FTU | Filtered Malt Beer Clarity FTU |
|---|---|---|---|---|---|---|---|
| 4 | PQ 5108 | 2.5 | 0.9 | Firm | 3–5 | 16–25 | 130–150 |
| 5 | PQ 5108 | 5.2 | 1.9 | Firm | 3–4 | 18–20 | 130–150 |
| 6 | PQ 4250 | 2.5 | 1.0 | Firm | 2–8 | 20–30 | 160–260 |
| 7 | CROSS-J.D.-4 | 2.7 | 0.9 | Firm | 2–3 | 8–9 | 120–130 |
| 8 | CROSS-J.D.-4 | 5.2 | 1.7 | Firm | 2–3 | 9–10 | 80–90 |
| 9 | CROSS-J.D.-4 | 6.7 | 2.3 | Firm | 2–3 | 7–9 | 90–100 |
| 10 | CROSS-J.D.-4 | 2.7 | 2.6 | Firm | 2–3 | 12–13 | 120–130 |
| 11 | FUJI #30 | 2.5 | 2.3 | Firm | 2–3 | 14–18 | 130–150 |
| 12 | FUJI #30 | 3.6 | 3.3 | Firm | 2–3 | 12–14 | NM |
| 13 | CABOT | 6.7 | 1.0 | Near Firm | 14–15 | 60+ | NM |
| 14 | NALCO #1072* | 5.0 | 1.5 | Near Firm | 17–25 | NM | NM |
| 15 | Control - Bentonite-Starch, with 1.8% Hi Flow Supercell to precoat filter | | | Semi Soft | 2 | 13 | 120–130 |

NM = not measured
*NALCO #1072 is a colloidal silica and not a silica gel useful in the present invention.

EXAMPLES 16–18

The following examples compare the resistance of beer to chill haze formation when treated by three different methods. These examples demonstrate the ability of starch-silica gel filter aid compositions of the invention to reduce chill haze when ruh (or unfiltered beer) is filtered through this medium.

For these examples, one lot of all-malt ruh beer was divided and filtered thus:

Example 16—Filtered using diatomaceous earth (no chillproofing treatment to the filtered beer).

Example 17—Filtered using a composition of the invention as described in Example 7 (no additional chillproofing treatment to the filtered beer).

Example 18—Filtration conducted as in Example 17 but with addition of 15 ppm of a papain chill-proofing agent to the filtered beer.

The bottled beers were pasteurized and then held at 50° C. for 48 hours, then cooled to 7° C. and held at 7° C. for 72 hours. After examining clarity at 7° C., the beers were frozen and thawed, clarity observed at 2° C. and at 20° C. The results are shown in Table II.

EXAMPLES 19–21

These examples show that the starch-silica gel filter aid composition of the invention contains little or no measurable soluble starch.

A sensitive test for detection of soluble starch uses iodine dissolved in dimethyl sulfoxide. The following tests were made by preparing a 10% suspension (10 grams in 100 milliliters water) of the composition indicated in Examples 19–21. After filtering the slurries to brilliance through Whatman #1 paper, 50 milliliters of filtrate were tested with a few drops of a dimethyl sulfoxide-iodine solution. The results were:

| Example | Starch | Filtrate Coloration by Iodine Test |
|---|---|---|
| 19 | Pearl Starch alone | blue |
| 20 | Bentonite Filter Aid Starch of U.S. 5,114,894 | tinge of blue |
| 21 | Silica gel filter starch of Example 7 | none |

The filter aid compositions of this invention can be advantageously used as a filter precoat for filtering a wide variety of liquids, particularly liquid beverages. The new filter aid composition can be used alone or in combination with other known filter precoat materials such as diatomaceous earths and others. The new filter aid compositions provide excellent clarity to chillproofed beers.

The filter aid compositions of this invention can also be advantageously employed as a body feed composition in slurry form. As is well known in the brewery art,

TABLE II

| Example | Treatment | Beer Incubated at 50° C. For 48 Hours, Then Held 72 Hours at 7° C. And Measured At 7° C.* (FTU**) | 0–2° C. (FTU) | 20° C. (FTU) | Chill Haze*** (Turbidity Units) |
|---|---|---|---|---|---|
| 16 | Diatomaceous Earth | 190 | 740 | 100 | 640 |
| 17 | CROSS-J.D.-4 Silica Gel Filter Starch | 130 | 610 | 100 | 510 |
| 18 | Papain Chillproofing (15 ppm) | 125 | 300 | 100 | 200 |

*Beer, after incubation at 50° C. for 48 hours, was cooled to 7° C. and held 72 hours and measured; then frozen and thawed to 0–2° C. and measured, followed by warming to 20° C. and measured.
**FTU = Formazin Turbidity Units
***Chill Haze = FTU reading at 0–2° C. minus reading at 20° C.

body feed materials such as a diatomaceous earth are added in amounts generally ranging from about 100 to 200 grams per 100 liters of beer as the beer is pumped to the primary filter.

After use, the filter aid composition of this invention can be used as animal feeds.

Those modifications and equivalents which fall within the spirit of the invention are to be considered a part thereof.

What is claimed is:

1. A dry granular composition for use as a filter aid for precoating a filter screen used to filter liquids comprising a major amount of a substantially water-insoluble phosphorylated starch and minor amounts of silica gel and cellulosic fibers, the particle size of the granular composition being sufficiently large for retention on a filter screen.

2. A composition in accordance with claim 1 wherein the combined amounts of silica gel and cellulosic fiber do not exceed about 10% by weight of the composition.

3. A bactericidal treated composition in accordance with claim 1.

4. A composition in accordance with claim 1 wherein the cellulosic fibers have an average length of at least about 60 microns.

5. A composition in accordance with claim 1 wherein the cellulosic fibers have a low capacity to absorb water.

6. A process for producing a dry granular composition for use as a filter aid for precoating a filter screen used to filter liquids which comprises reacting starch with a phosphorylating agent to produce a substantially water-insoluble phosphorylated starch, incorporating with the phosphorylated starch minor amounts of silica gel and cellulosic fibers, drying the phosphorylated starch, silica gel and cellulosic fiber mixture, and recovering dry granules of a desired particle size.

7. A process in accordance with claim 6 wherein prior to drying of the recited mixture it is washed with an aqueous solution of a microbicide.

8. A process in accordance with claim 6 wherein the reaction of the starch and phosphorylating agent is conducted at a temperature of at least about 60° C.

9. A process in accordance with claim 6 wherein a viscosity stabilizing agent is included during reaction of the starch and phosphorylating agent.

10. A process in accordance with claim 6 wherein drying is accomplished at a temperature above about 50° C.

11. A process in accordance with claim 6 wherein the cellulosic fibers have a low capacity to absorb water.

12. A process for filtering a liquid which comprises passing through a mesh screen to build up thereon a filter precoat an aqueous slurry of a granular precoat composition comprising a major amount of a substantially water-insoluble phosphorylated starch and minor amounts of silica gel and cellulosic fibers, the particle size of the granular composition being sufficiently large for retention on a filter screen.

13. A process in accordance with claim 12 wherein the liquid being filtered is beer.

14. A process in accordance with claim 12 wherein the combined amounts of silica gel and cellulosic fiber do not exceed about 10% by weight of the precoat composition.

15. A process in accordance with claim 12 wherein a bacteriocidal treated precoat composition is employed.

16. A process in accordance with claim 12 wherein the cellulosic fibers in the precoat composition have an average length of at least about 60 microns.

17. A process in accordance with claim 12 wherein the cellulosic fibers have a low capacity to absorb water.

* * * * *